Patented Feb. 13, 1945

2,369,371

UNITED STATES PATENT OFFICE 2,369,371

RESINOUS CONDENSATION PRODUCTS OF DIAMINOTETRAZINE AND AN ALDEHYDE

Joseph K. H. Seiberlich, Durham, N. H.

No Drawing. Application January 27, 1943,
Serial No. 473,749

6 Claims. (Cl. 260—9)

My present invention is based upon the discovery that resinous condensation products having useful properties can be produced by reacting an aldehyde, such as formaldehyde and paraformaldehyde, with diamino tetrazine represented by the structural formula

Diamino tetrazine reacts in neutral aqueous solution with formaldehyde in nearly all molecular proportions to produce a methylol compound which precipitates from the reaction mixture. The reaction can be speeded up by heating or by slightly acidifying the reaction mixture. The speed of the reaction generally is slower if the reaction mixture is alkaline. Preferably, the pH is maintained at about 5. The precipitated methylol compound is soluble in hot water but if separated and heated, polymerization takes place and the product becomes a water insoluble resin. The reaction may be carried out with the reactants in solution in organic solvents, such as glycol, glycerine or other alcohols, oils or the like instead of in aqueous solution. When a liquid aldehyde, such as paraformaldehyde, is used the reaction may be carried out in the absence of any solvent. The reaction may take place at normal atmospheric pressure or above or below atmospheric pressure.

The ratio of formaldehyde to diamino tetrazine may be varied between 1 to 1 and 25 to 1. The reaction may take place in one step or in successive steps by adding small amounts of aldehyde successively and permitting each to react separately with the diamino tetrazine.

In addition to aldehydes, other materials may be added to the reaction mixture and enter into the reaction. For example, ureides, urea and other amino compounds and organic compounds having one or more hydroxy groups, such as ethyl alcohol, glycol, sorbitol, glycolaldehyde, glucose, sucrose, cellulose, starch and furfuryl alcohol may be added.

The methylol product can be melted and cast or while in solution can be mixed with plasticizers and cast in molds and cured. It may be used as an adhesive for paper or plywood manufacture or as a sizing and stiffening agent in textiles or as a carrier or binding agent in paints or lacquers. It may be used alone or in blends with natural resins or synthetic resins, such as phenol formaldehyde and urea formaldehyde or similar compounds or may be mixed with pigments, dyestuffs, fillers, plasticizers or water repelling agents. The product may be used to produce plastics molded under heat and pressure. The products all have good stability in the presence of water.

Instead of formaldehyde other aliphatic or aromatic or heterocyclic aldehydes or derivatives of aldehydes or compounds yielding aldehydes may be used. For example, formaldehyde, acetaldehyde, crotonaldehyde, acrolein, benzaldehyde, furfural, paraformaldehyde, paraldehyde, trioxymethylene, nitroaldehydes, chloro-aldehydes and sulph-aldehydes, etc., may be used. In the appended claims, such materials are not excluded by the term "aldehyde."

Also, instead of diamino tetrazine other amino derivatives may be used in the practice of the invention. Thus, the invention contemplates a condensation product produced by reacting as essential reactants an aldehyde and a tetrazine having at least one amino group with at least one reactive hydrogen atom and having the structure

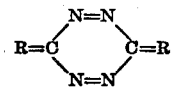

where R is an alkylene radical, NH or two of the monovalent groups H, OH, halogen, alkyl, aryl, aralkyl, and NH₂.

The invention is illustrated further by the following examples:

Example 1

100 parts of diamino tetrazine are heated on a steam bath with 500 parts of an aqueous formaldehyde solution until an insoluble precipitate occurs. The precipitate is washed and dried by heating, softens and melts, and, after cooling, forms an enamel-like mass. The methylol compound can be dissolved in hot water and used for impregnating textiles or paper.

Example 2

180 parts of diamino tetrazine and 450 parts of neutralized formaldehyde solution was heated under a reflux condenser on a water bath. When the precipitation of the methylol compound was complete, the heating was interrupted and the precipitate separated from the rest of the liquid. An aqueous suspension of the precipitate was mixed with 100 parts of cellulose and kneaded and dried at a temperature of about 70° C. The product is molded and cured at 145° C. under a pressure of 2000 lbs./sq. in. for 90 seconds. A shiny, very hard plastic is obtained with good resistance towards water.

Example 3

150 parts of diamino tetrazine was heated with 425 parts of neutral formaldehyde solution and the resulting precipitate separated from the rest of the liquid. This was mixed with an aqueous suspension of 100 parts of potato starch or oxidized starch, and, after drying, was molded and cured at 140° C. and 2200 lbs. pressure per square inch. The molded plastic showed excellent opacity and lustre.

Example 4

The tetrazine resin produced in Example 1 was mixed with 15% of a urea formaldehyde resin and molded at 150° C. and 2000 lbs. pressure per square inch.

Example 5

The tetrazine resin of Example 1 was blended with 40% of a phenolformaldehyde resin and molded at 150° C. and 2800 lbs. pressure per square inch.

Example 6

An aqueous solution containing 3 percent by weight of the tetrazine resin was used for impregnating unsized paper. Several sheets of impregnated and dried paper were placed together in a stack in a molding press and cured at 135° C. and 1500 lbs. pressure/sq. in. The molded product was a hard, compact, laminated sheet.

Example 7

An aqueous solution containing 3 percent by weight of the tetrazine resin was used for impregnating a fabric. The nearly dried impregnated fabric was subjected to ironing with a pressing iron. A stiffened fabric was obtained which had a better resistance to moisture than starch impregnated fabrics possess.

Example 8

15 grams of diamino tetrazine resin was boiled for 2 hrs. under a reflux condenser with 100 c. c. butyl alcohol. The mixture was acidified with sulfuric acid to a pH of 5. The resulting product was used as a varnish.

Example 9

100 grams of an aqueous resin solution made by reacting equimolecular proportions of diamino tetrazine and formaldehyde were mixed with about 2 percent of plasticizer, such as sorbitol hexa-acetate or sucrose acetate. The mass was poured into molds and cured for 72 hrs. at a temperature not exceeding 85° C.

Example 10

25 grams of diaminotetrazine are mixed with 50 gms. furfural and heated for 30 minutes on a water bath. A thick brownish resin is formed, which will become more solid after addition of 0.5% sulphuric acid. The thickened resin is mixed with wood shavings or other fillers in a ratio of 1:1 and cured under the molding conditions described above.

Example 11

50 gms. diaminotetrazine are heated with 125 gms. benzaldehyde under reflux condenser for 2 hours. Afterwards 5 ccs. of a 1% sulphuric acid are added and heating is continued for another 30 minutes. Afterwards the excess of benzaldehyde is removed by distillation and the remaining residue is mixed with wood shavings in a ratio 1:2 and cured as in Example 10.

I claim:

1. The process which comprises condensing an aldehyde and a tetrazine having the structural formula

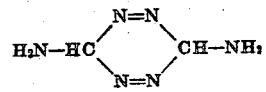

2. The process which comprises condensing formaldehyde and a tetrazine having the structural formula

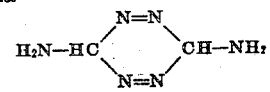

3. The product having as an essential ingredient a compound having the structure

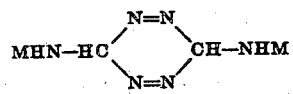

where M is a methylol group.

4. The process which comprises condensing an aldehyde, an alcohol and a tetrazine having the structural formula

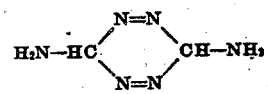

5. The process which comprises condensing an aldehyde, a carbohydrate and a tetrazine having the structural formula

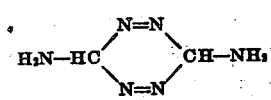

6. The resinous product resulting from the reaction of an aldehyde and a tetrazine having the structural formula

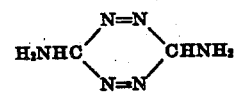

JOSEPH K. H. SEIBERLICH.